US012596933B2

(12) United States Patent
Friede et al.

(10) Patent No.: US 12,596,933 B2
(45) Date of Patent: Apr. 7, 2026

(54) CONTEXT-AWARE ENTITY LINKING FOR KNOWLEDGE GRAPHS TO SUPPORT DECISION MAKING

(71) Applicant: NEC Laboratories Europe GmbH, Heidelberg (DE)

(72) Inventors: David Friede, Heidelberg (DE); Kiril Gashteovski, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 1283 days.

(21) Appl. No.: 17/392,319

(22) Filed: Aug. 3, 2021

(65) Prior Publication Data

US 2022/0300831 A1    Sep. 22, 2022

Related U.S. Application Data

(60) Provisional application No. 63/163,126, filed on Mar. 19, 2021.

(51) Int. Cl.
  *G06N 5/022*     (2023.01)
  *G06N 3/08*      (2023.01)
(52) U.S. Cl.
  CPC ............... *G06N 5/022* (2013.01); *G06N 3/08* (2013.01)
(58) Field of Classification Search
  CPC ................................. G06N 5/022; G06N 3/08
  See application file for complete search history.

(56) References Cited

U.S. PATENT DOCUMENTS

| | | | |
|---|---|---|---|
| 10,303,999 B2 | 5/2019 | Hertz et al. | |
| 2010/0228782 A1* | 9/2010 | Rao ....................... | G06F 16/367 |
| | | | 707/E17.046 |

(Continued)

FOREIGN PATENT DOCUMENTS

| | | | | |
|---|---|---|---|---|
| CN | 110941722 A | | 3/2020 | |
| CN | 112612903 A | * | 4/2021 | |
| WO | WO-2021223856 A1 | * | 11/2021 | ........... G06F 16/353 |

OTHER PUBLICATIONS

Yao, L., Mao, C., & Luo, Y. (2019). KG-BERT: BERT for Knowledge Graph Completion. ArXiv, abs/1909.03193. (Year: 2019).*

Mohamed, S. K., Nováček, V., & Nounu, A. (Jan. 2020). Discovering protein drug targets using knowledge graph embeddings. Bioinformatics, 36(2), 603-610. (Year: 2020).*

Sun, Zequn et al. "*Bootstrapping Entity Alignment with Knowledge Graph Embedding,*" IJCAI 2018, Sweden, Jul. 13-19, 2018, pp. 4396-4402.

Wu, Yuting et al. "*Relation-Aware Entity Alignment for Heterogeneous Knowledge Graphs,*" IJCAI 2019, arXiv:1908.08210v1, Cornell University, US, Aug. 22, 2019, pp. 1-7.

(Continued)

*Primary Examiner* — Michael J Huntley
*Assistant Examiner* — Maggie Thanh Maido
(74) *Attorney, Agent, or Firm* — Leydig, Voit & Mayer, Ltd.

(57)        ABSTRACT

A machine learning model includes a context transformer and a decision head. The context transformer is a neural network of self-attention layers. The model makes a link prediction for a query embedding. Input embeddings are received at inputs of the context transformer. The input embeddings have: a query embedding set, the query embedding set comprising a subject embedding, object embedding, and relation embedding, one of the subject embedding, the object embedding, and the relation embedding being the query embedding; and knowledge graph embeddings. A first self-attention layer generates an attention score for each of the input embeddings. A final layer of the context transformer generates the link prediction for the query embedding and an output associated with each of the input embeddings. The decision head combines the attention score and the output for each of the input embeddings to determine a significance score for each of the input embeddings.

17 Claims, 5 Drawing Sheets

(56) References Cited

U.S. PATENT DOCUMENTS

| | | | | |
|---|---|---|---|---|
| 2018/0159876 A1* | 6/2018 | Park | | H04L 63/1425 |
| 2019/0042988 A1 | 2/2019 | Brown et al. | | |
| 2020/0073944 A1* | 3/2020 | Mishra | | G06F 40/247 |
| 2020/0342954 A1* | 10/2020 | Ul Ain | | G16B 40/00 |
| 2021/0406706 A1* | 12/2021 | Hasan | | G06F 40/284 |
| 2022/0067030 A1* | 3/2022 | Jiao | | G06N 3/084 |
| 2022/0121822 A1* | 4/2022 | Zhou | | G06F 40/295 |
| 2022/0138170 A1* | 5/2022 | Misiewicz | | G06N 5/022 |
| | | | | 707/737 |

OTHER PUBLICATIONS

Trisedya, Bayu Distiawan et al. "*Entity Alignment between Knowledge Graphs Using Attribute Embeddings*,". AAAI 2019, US, Jan. 27-Feb. 1, 2019, pp. 297-304.

Wang, Lucy Lu et al.: *Ontology Alignment in the Biomedical Domain Using Entity Definitions and Context*, ACL BioNLP 2018, Australia, Jul. 19, 2019, pp. 47-55.

Chen, Sanxing et al. "*HittER: Hierarchical Transformers for Knowledge Graph Embeddings*," arXiv:2008.12813v1, Aug. 28, 2020, Cornell University, US, pp. 1-12.

Vaswani, Ashish et al., "Attention is All You Need," Jun. 12, 2017, arXiv:1706.03762v1, Cornell University, US, pp. 1-15.

Alammar, Jay, "The Illustrated Transformer," Jun. 2018, GitHub Pages, US, pp. 1-23.

Hogan, Aidan et al. "Knowledge Graphs," arXiv:2003.02320v6, Cornell University, US, Sep. 11, 2021, pp. 1-135.

Zhu, Qiannan et al. "Neighborhood-Aware Attentional Representation for Multilingual Knowledge Graphs," Proceedings of the 28th International Joint Conference on Artificial Intelligence, pp. 1943-1949, Aug. 10-16, 2019, Macao.

Zhao, Xiaojuan et al. "Multi-source knowledge fusion: a survey," Springer, Germany, Apr. 8, 2020, pp. 2567-2592.

Nathani, Deepak et al., "Pay Attention, Relations are Important," Jul. 12, 2019, GitHub Pages, US, pp. 1-8.

Hu, Shengze et al. "Entity Linking via Symmetrical Attention-Based Neural Network and Entity Structural Features," Symmetry 2019, 11, 453, Apr. 1, 2019, MDPI, Switzerland, pp. 1-18.

Mao, Jiayuan et al. "Bootstrapping Knowledge Graphs From Images and Text," Frontiers in Neurorobotics, Nov. 12, 2019, Frontiers Media SA, Switzerland, pp. 1-12.

Mulang, Isaiah Onando et al. "Encoding Knowledge Graph Entity Aliases in Attentive Neural Network for Wikidata Entity Linking," arXiv:1912.06214v3, Sep. 26, 2020, Cornell University, US, pp. 1-15.

Mahdisoltani, Farzaneh et al. "YAGO3: A Knowledge Base from Multilingual Wikipedias," pp. 1-11, 7th Biennial Conference on Innovative Data Systems Research (CIDR 2015), Jan. 4-7, 2015, US.

Vrandečić, Denny, "Wikidata: a new platform for collaborative data collection," Abstract, WWW '12 Companion: Proceedings of the 21st International Conference on World Wide Web, France, Apr. 2012, pp. 1-4.

Pei, Shichao et al. "Semi-Supervised Entity Alignment via Knowledge Graph Embedding with Awareness of Degree Difference," The World Wide Web Conference, US, May 2019, pp. 3130-3136.

* cited by examiner

100

900

902 — Processor(s)

904 — Memory

906 — I/O

908 — Sensor(s)

910 — UI(s)

912 — Actuator(s)

CONTEXT-AWARE ENTITY LINKING FOR KNOWLEDGE GRAPHS TO SUPPORT DECISION MAKING

CROSS-REFERENCE TO RELATED APPLICATION

Priority is claimed to U.S. Provisional Patent Application No. 63/163,126, filed on Mar. 19, 2021, the entire disclosure of which is hereby incorporated by reference herein.

FIELD

The present invention relates to a method, system and computer-readable medium for link prediction and/or entity alignment for knowledge graphs.

BACKGROUND

Knowledge graphs (KGs) are graph-based databases for storing knowledge where each knowledge graph is a set of triples (e.g., subject, relation, object). Such representation of human knowledge is useful for many downstream applications, including information retrieval, web search, and recommendation systems.

Usually, most knowledge graphs are automatically constructed from semi-structured data (e.g., infoboxes from Wikipedia articles). While such knowledge graphs contain high-precision triples, they still suffer from incompleteness. In particular, there are still many relevant facts about the entities that are missing from the knowledge graphs. One common reason for having these missing facts is the limits of the information content of the semi-structured resources. For example, the semi-structured resources usually contain only the most relevant information about the entities, though not all relevant information.

Contextual information, however, is sensible when predicting new links in knowledge graphs. Two key problems to solve when handling general context within a self-attention based model are the following: (1) How can the model differentiate between different types of context while still recognizing connected information? (2) How can the useful context information that the model used for its decision-making be uncovered?

SUMMARY

An embodiment of the present invention provides a machine learning model that includes a context transformer and a decision head. The context transformer is a neural network of self-attention layers. The model makes a link prediction for a query embedding. Input embeddings are received at inputs of the context transformer. The input embeddings have: a query embedding set, the query embedding set comprising a subject embedding, object embedding, and relation embedding, one of the subject embedding, the object embedding, and the relation embedding being the query embedding; and knowledge graph embeddings. A first self-attention layer generates an attention score for each of the input embeddings. A final layer of the context transformer generates the link prediction for the query embedding and an output associated with each of the input embeddings. The decision head combines the attention score and the output for each of the input embeddings to determine a significance score for each of the input embeddings.

BRIEF DESCRIPTION OF THE DRAWINGS

Embodiments of the present invention will be described in even greater detail below based on the exemplary figures.

The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
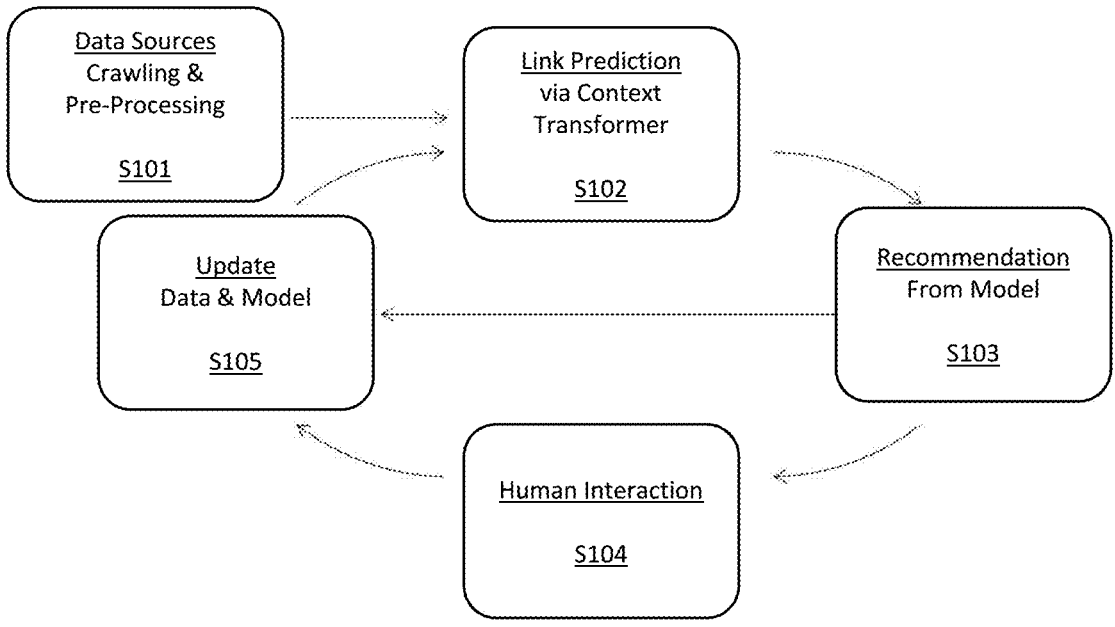
FIG. 1 illustrates an overall workflow of an embodiment of the present invention.

To go beyond the above-described limits of information content, embodiments of the present invention leverage information from additional sources (e.g., information from large natural language text corpora) using a self-attention based neural network model specifically tailored to incorporate context into the link prediction problem.

Self-attention (also be known in the art as intra-attention) is an attention mechanism relating different positions of a single sequence (or other data collection) in order to compute a representation of the sequence. Self-attention has been used successfully in a variety of tasks including reading comprehension, abstractive summarization, textual entailment and learning task-independent sentence representations. A self-attention model allows inputs to interact with each other (i.e. calculate attention of all other inputs with respect to one input).

Embodiments of the present invention provide a method and system that, with the use of a self-attention based neural network model, exploits a variety of context information to address the problems of link prediction and/or entity alignment on knowledge graphs. Embodiments of the present invention enable the neural network model to differentiate between types of context and enable visualization of the most impactful input information during validation. An improved feature of embodiments of the present invention is that its working is more explainable, enabling a smooth interaction between the linking system and human annotators. Another improved feature of embodiments of the present invention is that its self-attention based model uses non-monotonous, double positional embedding schema and a decision head that receives the output of the self-attention layer of the neural network model.

According to embodiments of the present invention, the self-attention based model simultaneously encodes information, including—but not limited to—relational graph context, external information in form of natural language, relational neighborhoods, rule-based logical context, as well as recursively self-generated and human-annotated new knowledge. In this way, multiple sources of information relevant for the target knowledge graphs are combined, solving the knowledge graph incompleteness problem.

As used in the context of the present invention, link prediction is the task of completing a knowledge graph (i.e., to predict true and unobserved knowledge in form of triples (links) within the knowledge graph). Knowledge graphs are by definition compact representations of information. However, sometimes it is beneficial to include deeper knowledge that is hidden within the graph structure (e.g., logical rules or even external information that is not part of the KG, like Wikipedia articles). Attention based models like the Transformer (see Vaswani, et al, "Attention is all you need," Advances in neural information processing systems, 5998-6008 (2017) (the entire contents of which is hereby incorporated by reference herein)) are well suited for the task of combining these kind of multiple sources of information simultaneously. Using an attention-based model as well as rule-based logical context has the second advantage of explainability of the model's behavior. The model's recommended new links can be reviewed by a human using the decision process of the model. Such newly created knowledge is highly accurate. Adding it to the existing data leads to an updated and stronger model after retraining.

An embodiment of the present invention provides a machine learning model that includes a context transformer and a decision head. The context transformer is a neural network of self-attention layers. The model makes a link prediction for a query embedding. Input embeddings are received at inputs of the context transformer. The input embeddings have: a query embedding set, the query embedding set comprising a subject embedding, object embedding, and relation embedding, one of the subject embedding, the object embedding, and the relation embedding being the query embedding; and knowledge graph embeddings. A first self-attention layer generates an attention score for each of the input embeddings. A final layer of the context transformer generates the link prediction for the query embedding and an output associated with each of the input embeddings. The decision head combines the attention score and the output for each of the input embeddings to determine a significance score for each of the input embeddings.

The machine learning model may operate in a training phase. During the training phase, the query embedding set can be a training embedding set having an associated ground truth vector for the query embedding. During the training phase, the method may further include: outputting the link prediction as a link prediction vector; comparing the link prediction vector with vectors of the knowledge graph embeddings; and iteratively training the content transformer, using backpropagation, to change the link prediction vector until it is within a predetermined distance to the ground truth vector.

The decision head may have a multilayer perceptron with sigmoid activation functions. During the training phase, the method may further include: receiving a predetermined significance score associated with at least one of the knowledge graph embeddings; iteratively training the decision head, using backpropagation, to change the significance score generated for the at least one of the knowledge graph embeddings until it is within a second predetermined distance to the predetermined significance score.

The predetermined significance score can be provided by a human operator.

The method may further include, prior to a training phase: transforming a plurality of triples of a knowledge graph into self-supervised training examples by masking an object, relation, or subject of each of the plurality of triples, each of the self-supervised training examples comprising an incomplete triple and associated ground truth data indicated the masked one of the object, relation or subject; receiving context data comprising a plurality of context relevant to the knowledge graph; respectively associate individual context of the plurality of context with relevant ones of entities, relations, and the triples of the knowledge graph; determine for each of the entities, the relations, the triples, and the plurality of context a type and a group; generate the query embedding from a selected one of the self-supervised training examples and the determined type and group of the selected one of the self-supervised training examples; and generate the knowledge graph embeddings from the triples of the knowledge graph and the type and the group for the entities, the relations, the triples, and the plurality of context.

The method may include splitting the self-supervised training examples into a training set and a validation set at random.

The method may include, after a training phase, a test phase including: for a plurality of the self-supervised training examples in the validation set: receiving, at query inputs of the inputs of the context transformer, a current validation embedding set, the current validation embedding set comprising a respective one of the plurality of the self-supervised training examples from the validation set; generating, by the first self-attention layer of the self-attention layers, the attention score for each of the knowledge graph embeddings and the current validation embedding set, generating, by the final layer of the neural network of the context transformer, the link prediction for the current validation embedding set and the output associated with each of the input embeddings, combining, by the decision head, the attention score and the output for each of the input embeddings to determine the significance score for each of the input embeddings; and outputting the link prediction and the significance score for the subset of the input embeddings; and determining an accuracy of model based on comparing the link prediction and the associated ground truth data associated with each of the plurality the plurality of the self-supervised training examples from the validation set.

The knowledge graph embeddings may be non-monotonous, double positional embeddings.

Each of the knowledge graph embeddings may include a knowledge graph content embedding combined with a related type-embedding and a related coherence-embedding.

In an entity alignment mode, the method may include providing the query embedding set with the relation embedding being a SameAs embedding and one of the subject embedding and the object embedding being the query embedding.

The method may include: outputting the link prediction and the significance score are output via a human-machine interface; receiving feedback input from the human-machine interface; and updating a knowledge graph according to a link prediction based on the feedback indicating an accepted link prediction.

An embodiment of the present invention provides a system having one or more processors which alone or in combination, are configured to provide for execution of a method for operating a machine learning model. The machine learning model includes a context transformer and a decision head. The context transformer includes a neural network having a plurality of self-attention layers. The machine learning model is configured to make a link prediction for a query embedding. The method of operating the model includes: receiving, input embeddings at inputs of the context transformer, the input embeddings comprising: a query embedding set, the query embedding set comprising a subject embedding, object embedding, and relation embedding, one of the subject embedding, the object embedding, and the relation embedding being the query embedding; and knowledge graph embeddings; generating, by a first self-attention layer of the self-attention layers, an attention score for each of the input embeddings, generating, by a final layer of the neural network of the context transformer, the link prediction for the query embedding and an output associated with each of the input embeddings, combining, by the decision head, the attention score and the output for each of the input embeddings to determine a significance score for each of the input embeddings; and outputting the link prediction and the significance score for a subset of the input embeddings.

An embodiment of the present invention includes a tangible, non-transitory computer-readable medium having instructions thereon which, upon being executed by one or more processors, alone or in combination, provide for execution of a method for operating a machine learning model. The machine learning model has a context transformer and a decision head. The context transformer has a neural network having a plurality of self-attention layers. The machine learning model is configured to make a link prediction for a query embedding. The method includes: receiving, input embeddings at inputs of the context transformer, the input embeddings comprising: a query embedding set, the query embedding set comprising a subject embedding, object embedding, and relation embedding, one of the subject embedding, the object embedding, and the relation embedding being the query embedding; and knowledge graph embeddings; generating, by a first self-attention layer of the self-attention layers, an attention score for each of the input embeddings, generating, by a final layer of the neural network of the context transformer, the link prediction for the query embedding and an output associated with each of the input embeddings, combining, by the decision head, the attention score and the output for each of the input embeddings to determine a significance score for each of the input embeddings; and outputting the link prediction and the significance score for a subset of the input embeddings.

FIG. 1 illustrates an overall workflow 100 according to an embodiment of the present invention.

The workflow 100 may begin with the acquisition and pre-processing of context data (e.g., external data) (S101). While many link prediction models can be solely based on the relational context of an existing knowledge graph, other sources of context data might need some kind of acquisition (e.g., crawling data sources) and/or pre-processing prior to executing the link prediction operation. Accordingly, the workflow 100 may have access to a plurality of data sources, which can be crawled/mined for context data.

For example, external data may be used to provide a different source of contextual knowledge outside of the knowledge graph. The external data may be specifically selected according to the use case. Accordingly, a user may provide context information that is particularly fitting for the use case, increasing the accuracy of the subsequent link prediction operation by the quality of the context information.

Embodiments of the present invention may use existing mechanisms for crawling and preprocessing. Further, the crawling and preprocessing steps are adaptable for the particular source of information being used for a specific application. For example, there are publicly available pipelines that crawl the internet, which can be used to obtain data, as well as to preprocess it (e.g., CommonCrawl, available at commoncrawl.org).

Embodiments provide external context with a corpus of open information extraction (OpenIE or OIE) triples, such that the arguments of each OpenIE triple contain unique data (e.g., a Wikipedia URL) for the entities. This allows for direct disambiguation of the entities in the OpenIE triples within the knowledge graphs. Thus, the OpenIE triples may have disambiguated canonical arguments, but the relations remain to be strings, i.e., natural language which is highly fitting for a transformer model.

The acquired data may then be pre-processed for use within the workflow 100. Embodiments of the present invention are capable of using any data object that can be reduced to embeddings.

For example, to induce logical context to the knowledge graph, state-of-the-art rule mining may be used. Also, to include local information of the knowledge graph, embodiments make use of a sampling method to obtain randomized neighborhoods.

Based on the processed data, the model (e.g., a self-attention based neural network model) predicts new links in the knowledge graph (S102). At least after the first iteration of the workflow 100, the prediction may additionally be based on pre-existing data and a current knowledge graph of the model.

According to an embodiment, the link prediction may be performed using a context transformer. A context transformer simultaneously encodes diverse sources of information provided by the processed data. In particular, the context transformer uses self-attention, combined with non-monotonous, double positional embedding scheme, to connect and combine each source of information automatically, all without the need of massive data pre-processing. This provides an advantage over other link prediction models that consider only isolated individual context or no context information at all. Also, the context transformer makes use of its self-attention mechanism to decide which source of knowledge is crucial for each link prediction, respectively.

In an embodiment, in the beginning of training, the self-attention based model connects all input equally through its self-attention mechanism. That is, there is a connection between each pair of input, respectively. These connections become stronger or weaker during training (e.g., through backpropagation). These connections ban be read through the attention score (e.g., score(inp1, inp2)=Q$(inp1)^T$K(inp2)). By looking at all connections of a specific input [output] simultaneously, a decision head of the model evaluates the significance of each context for the specific input [output] item. The higher the score, the more significant, and thus, crucial, the source of information is for the link prediction.

A context transformer according to the present invention, therefore, is a supervised (or semi-supervised) neural network machine-learning model comprising a self-attention layer and a decision head, where the model uses non-monotonous, double positional embedding schema, and the decision head receives an output from the self-attention layer and scores context information according to its significance.

In general, a link prediction model's output can often be difficult to understand or even misinterpreted by humans. This issue is complicated by the fact that link prediction models may err in cases that are obvious to humans. To overcome this gap between machines and humans, the link prediction model of embodiments of the present invention recommends new links with an explanation of its decision process (S201). A confidence score may also be provided for each link prediction. Both the confidence score and the recommendation may be provided by the prediction model's attention mechanism. The explanation is based on the context information leading to its confidence and crucialness determination.

Therefore, an advantage of the link prediction model is that its output makes it feasible to include a human into the pipeline. As such, the workflow 100 includes a mechanism for human interaction (S104). Through the human supervision (S104), the newly created knowledge is highly accurate; and can thus be re-used to further strengthen the method in an iterative manner.

For example, an embodiment may include a human-computer interface that presents the link recommendations of the model as well as its decision process and confidence scores to human annotators. The human annotators may then decide whether to include or reject the new knowledge (i.e., the recommended link) in the knowledge graph, and provide that input to the workflow 100. The human interaction is especially useful in cases in which the model is either not confident about its decision or the knowledge is of sensitive nature (e.g., links in biomedical knowledge graphs of patients that contains sensitive personal data). This human interaction is enhanced by the explainability and confidence score of the link prediction and recommendation.

The iteration of the workflow concludes with updating the data (e.g., the links and context) and the model (S105) based on the recommendation and/or the human interaction.

As a person of ordinary skill in the art would understand, recursive use of a model often yields unwanted side effects. For example, possible errors in earlier steps accumulate over time, and can eventually break the model entirely. This is where embodiments of the present invention have another advantage. Through the human in-the-loop, embodiments have a much lower risk of adding error-prone links. The newly created knowledge by the model is on par with the human annotated base data. This makes it possible to include these new links into the knowledge graph, run the workflow on this updated knowledge graph anew, and continue recursively. On behalf of efficiency, embodiments may reuse most of the pre-processing and computations from earlier runs, and use updates instead of starting each time from scratch.

Figure 2:
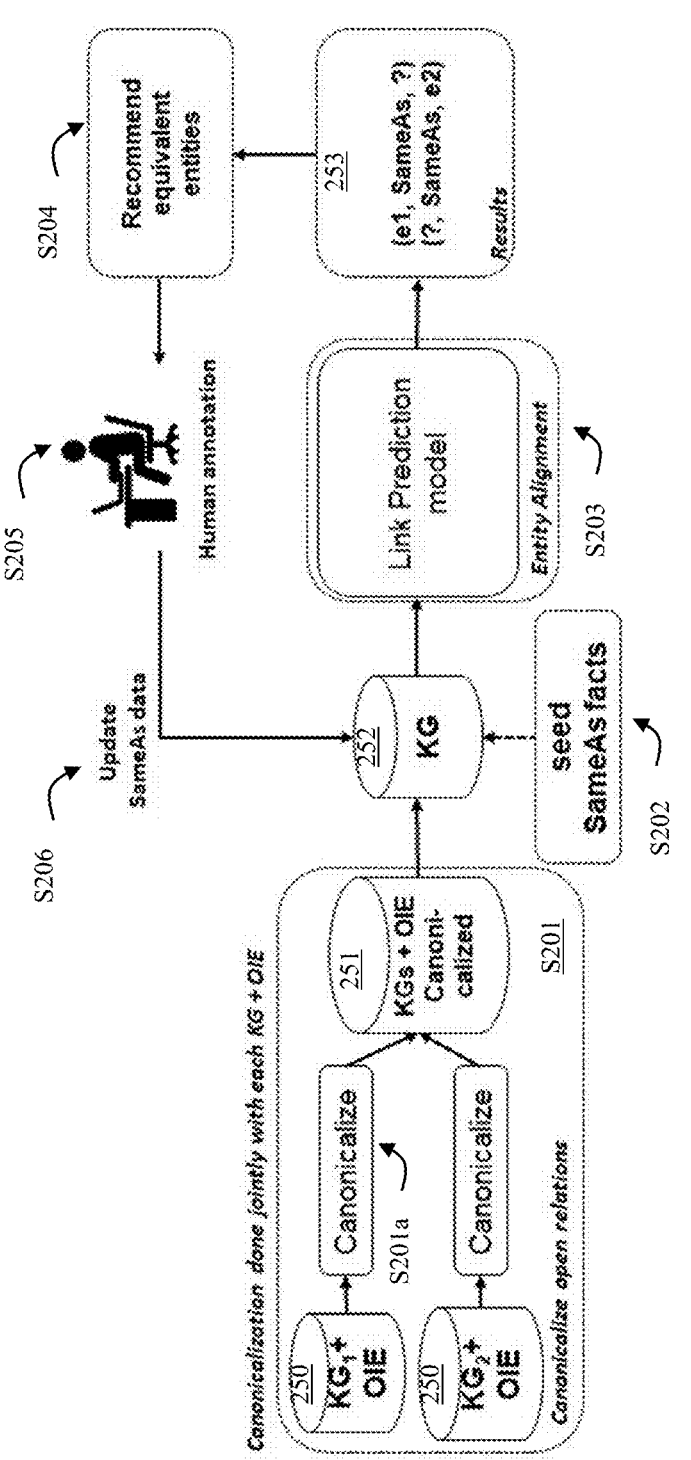
FIG. 2 illustrates an embodiment of an entity alignment with human in the loop workflow according to the present invention.

FIG. 2 illustrates an embodiment of a knowledge graph update workflow 200 that includes entity alignment with a human in-the-loop. Entity alignment (EA) is a special case of the link prediction problem. In particular, entity alignment is the goal to align equivalent entities between two knowledge graphs.

The knowledge graph update workflow 200 operates on a joint knowledge graph, which is made up of multiple knowledge graphs. The knowledge graph update workflow 200 may begin with a data preprocessing operation (S201) to create a canonicalized joint knowledge graph. Canonicalization, as known in the art, is the process of converting data that involves more than one representation into a "standard" or "canonical" representation. In knowledge graphs, canonicalization can for example take two different arguments from different triples that differ (e.g., differ at a string level) but refer to the same concept and merge them into one semantic group.

The data sources 250 accessed for data preprocessing may contain knowledge graphs ($KG_1$, $KG_2$ . . . $KG_x$) with Open Information Extraction (OpenIE or OIE) triples. Open Information Extraction (OpenIE) methods need neither supervision nor any pre-specified ontology. Given unstructured text documents, OpenIE methods readily extract triples of the form (noun phrase, relation phrase, noun phrase) from them, resulting in the development of large Open Knowledge Bases (Open KBs). Examples of Open KBs include Text-Runner, ReVerb, and OLLIE. While this makes OpenIE methods highly adaptable, the noun phrases and relation phrases in Open KBs are not canonicalized (i.e., there are duplicative non-standardized representations of entities). This results in storage of redundant and ambiguous facts.

Accordingly, the pre-processing operation (S201) canonicalizes (S201a) the open relations of the open knowledge bases (in other words, maps multiple references of same entities into unique clusters). In particular, the canonicalization operation (S201a) is done jointly with each KG+OIE (knowledge graph and related OpenIE context information), creating a canonicalized data source 251 of the canonicalized KGs+OIE.

The canonicalization operation (S201a) connects link prediction with canonicalization in a single full pipeline (i.e., both tasks can support each other). In this way, fixed clusters of synonymous relations are learned, such that they can eventually be read out. Embodiments of the present invention are capable of implementing various canonicalization methods known to persons of ordinary skill in the art. For example, the canonicalization operation (S201a) may comprise one or more of the following steps: (1) learn embeddings for the OIE relations; (2) learn embeddings for the clusters; (3) connect the embeddings of the OIE relations with the clusters (e.g., using attention to learn these connections end-to-end); (4) use the embeddings of the clusters for link prediction; (5) train the full model simultaneously with the an implementation of the link prediction operation; and/or (6) read out the learned clusters (e.g., by replacing the original OIE relations with its corresponding cluster ID).

The pre-processing operation (S201) may also merge the canonicalized KGs+OIE into a joint KG 252. According to an embodiment, the merging step may put the triples from both KGs into one large KG according to the following computer-implemented algorithm:

```
KG=empty_DB
for triple in KG1:
    KG.add(triple)
for triple in KG2:
    KG.add(triple).
```

The accuracy of the entity alignment performed by embodiments improves with canonicalization methods having increased scalability. Additionally, performance is increased with an increase in available textual context, particularly via OpenIE extractions.

The joint KG 252 may then be seeded with equivalent entities (S202). The seeding includes storing, in the joint KG 252, the equivalent entities as triples in the form (ex, SameAs, $e_y$). Where $e_x$ and $e_y$ represent entity representations in the joint KG 252 that are equivalent (i.e., the triples are SameAs facts). The seed entities can be provided by an operator or generated automatically.

Then, the link prediction model is trained on the joint KG 252 (S203). In the training operation, the training triples are all triples from the originating KGs and a sample of the equivalent entity triples. The results 253 of the link prediction model training are links between equivalent entity triples. The model then presents a recommendation to a human operator on the equivalent entities (S204). The human operator then establishes which of the recommendations are correct (S205). The joint KG 252 is then updated with the correct equivalent entities from the recommendations (S206). The workflow 200 then iterates.

For illustration, suppose there are two knowledge graphs: $KG_1$ and $KG_2$. $KG_1$ contains the entity $e_1$="Joe Biden", and $KG_2$ contains the entity $e_2$="Joseph Robinette Biden Jr". Given such information alone, it is not entirely clear if the entities $e_1$ and $e_2$ are equivalent. Once contextual information around each of these entities are considered (e.g., both $e_1$ and $e_2$ are presidents of United States, both received a BA degree from University of Delaware, etc.), it becomes clearer that they are indeed equivalent. With the problem formulation, the entity alignment problem is treated as a link prediction problem. See, e.g., Zequn Sun, Wei Hu, Qingheng Zhang, and Yuzhong Qu, "Bootstrapping Entity Alignment with Knowledge Graph Embedding," IJCAI (2018) (the entire contents of which is hereby incorporated by reference herein). In particular, $KG_1$ and $KG_2$ are merged into one KG, and the seed equivalent entities are stored across KGs as triples of the form $(e_1, SameAs, e_2)$. Then, the model is trained on the joint KG, such that the training triples are: 1) all triples from $KG_1$ and $KG_2$; 2) sample of SameAs-triples $(e_1, SameAs, e_2)$. The validation and testing is performed on SameAs-triples only. The resulting triples are given to human annotator in order to decide whether they are correct. If they are, the KG is updated and the process iterates.

Figure 3:
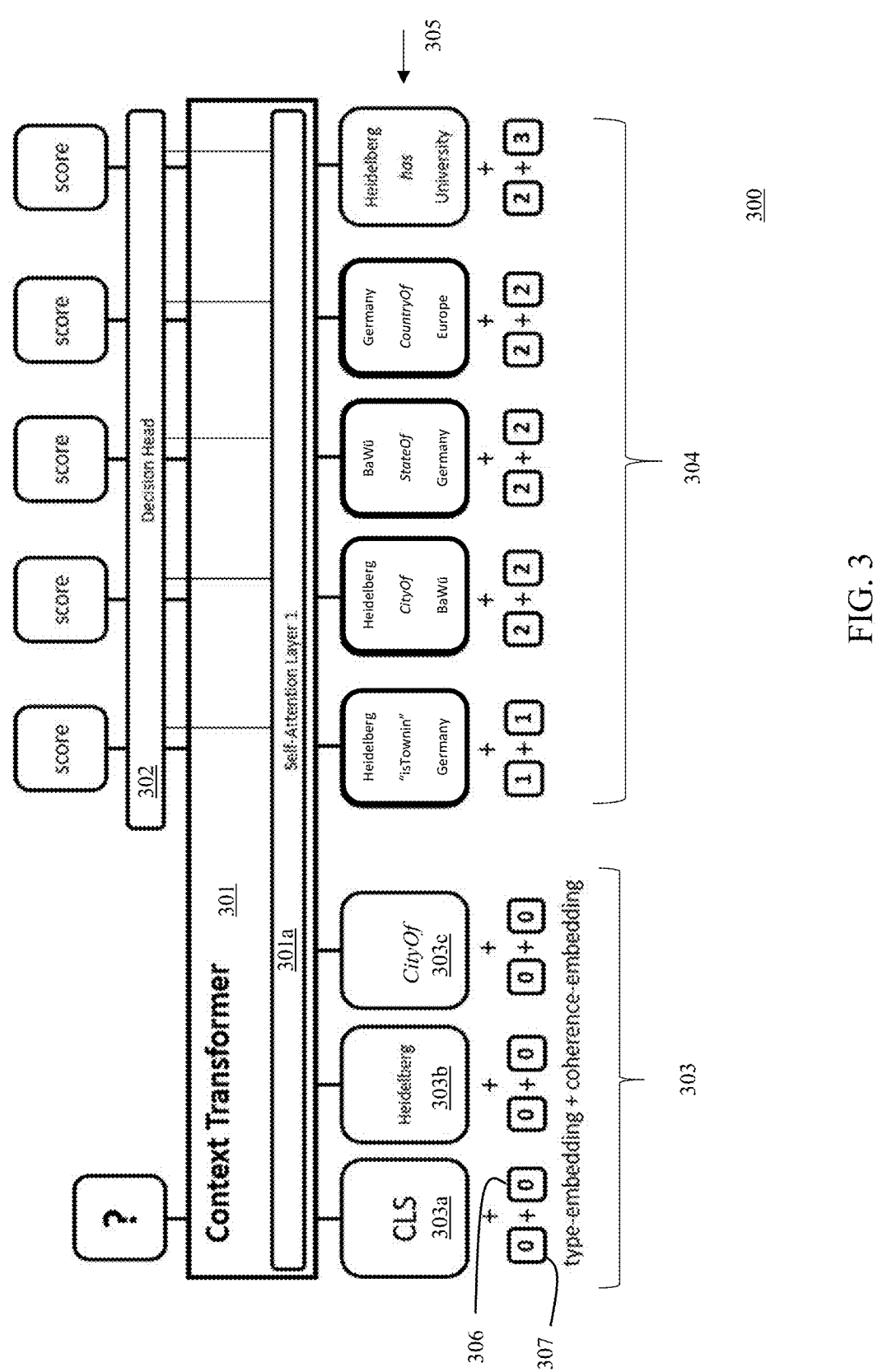
FIG. 3 illustrates an embodiment of a machine learning model system according to the present invention.

FIG. 3 illustrates and embodiment of a machine learning model 300 according to an embodiment of the present invention. The machine learning model 300 may be instantiated as the link prediction model, with or without entity alignment. The machine learning model 300 includes a context transformer 301 and a decision head 302.

The context transformer 301 is an attention-based machine learning model, specifically a self-attention based neural network model.

The attention-based model can take a variety of different data sources as input (i.e., tokens) to support its link prediction. For example, external context like OpenIE links that are crawled from the English Wikipedia, or reason-based context that is obtained by rule-mining mechanisms on the knowledge graph.

The self-attention based neural network model of the context transformer 301 may include a plurality of self-attention layers, including at least a first self-attention layer 301a ("Self-Attention Layer 1"). For example, and embodiment of the present invention may include six self-attention layers, and each self attention layer may 301a be identical.

In an embodiment, the first self attention layer 301a is the first layer of the self-attention based neural network model of the context transformer 301. The self-attention layers may include a plurality of self attention heads, which receive and input and generate an output. In the embodiment of FIG. 1, the self-attention layers include 8 self-attention heads, as indicated by the eight inputs 301—in to the context transformer 301.

As explained above the machine learning model 300 is configured as a link prediction model. In particular, the machine learning model 300 is configured to predict a link from a subject via a relation. The inputs to the machine learning model 300 include entities, relations, a query, and various context information. These items of input can be referred to as "tokens".

In an embodiment, for each entity token and each relation token, a lookup table (i.e., a map from token to embedding space) may be used to generate a corresponding embedding (e.g., a 256-dimensional real vector). These embeddings include trainable parameters that change over time. The same token, however, will always map to the same embedding. We also have a unique classifier embedding for the query object (CLS).

The machine learning model 300, specifically the context transformer 301, is configured to receive at its input a query triple 303. The query triple 303 includes a query token (or query object—CLS) 303a, a subject token 303b—which is a type of entity token, and a relation token 303c. In the example shown, the subject token 303b represents "Heidelberg" and the relationship token 303c represents "cityOf".

The query token 303a is used to identify the link to the unknown entity, which is to be predicted. The machine learning model 300 also receives at its input context information 304. The context information 304 may be manually obtained/selected (at least during the training phase) based on an assumed relevance to the query triple 303. Each instance of every format of information (e.g., words, open relations, pixels, KG paths, etc.) can be considered its own token, and therefore, gets its own embedding. In other words, the context information 304 can include a plurality of context tokens 305.

Embodiments of the present invention also make use of a two-dimensional positional embedding, called the type-embedding and coherence-embedding, that further enables the self-attention based model to be context aware. For example, the type-embedding and coherence-embedding provide context information on how the multiple context tokens 305 and/or the query tokens 303a-c connect together. In particular, the type-embedding encodes the different types of context like OIE triples, reasoning based context, images etc., while the coherence-embedding connects all the context information that belongs together.

Multiple context information "belongs" together when the information does not fit into a single token, but has some other known association, e.g., rule-based context as in: Query: country (Heidelberg, ?); Context: state (Heidelberg, Baden-Württemberg); country (Baden-Wurttemberg, Germany). In addition, context from the same source can "belong" together, e.g., OIE triples from the Wikipedia page of Heidelberg as well as the main image from the same Wikipedia page.

In the embodiment shown in FIG. 3, to connect the input tokens, certain ones of the input tokens are given the same coherence embedding 306 (e.g., a group number) as others giving the context that such tokens share a quality indicating that they belong to the same group of tokens. For example, each of the query tokens 303a-c of the query triple 303 can be assigned the group number 0 via their coherence tokens 306, indicating the context that they share the same quality of belonging to the query group.

Furthermore, the machine learning model 300 can capture the context of the different types of information associated with the tokens (e.g., rules or OIE triples) via type embeddings 307. In the embodiment shown in FIG. 3, to induce the type embeddings 307 into the model 300, type numbers are used. The type numbers are unique for each type of information. For example, the query triples can have a type number 0, and OIE triples can have type number 1.

To provide the type embeddings and group embeddings, two embedding lookup tables may be used, one for identifying group numbers and one for identifying type numbers.

Accordingly, the machine learning model receives three different embeddings for each input. Namely, one for each of: the primary content tokens (e.g., query tokens 303a-c and context tokens 305); type numbers; and group numbers. Because each of these embeddings are vectors (e.g., of dimension 256), and they can be added up.

After adding up each of the embeddings for each input, a single embedding is created for each input token to the context transformer 301.

The embodiment of FIG. 3 is shown with 8 inputs, accordingly there are 8 input tokens (i.e., 8 combinations of content embedding+coherence embedding+type embedding). Embodiments of the present invention, however, are not so limited. For example, more than 8 inputs may be used (e.g., 50, 100, etc.). Regardless, it is preferred that a token be provided at each input. If fewer content tokens are generated than inputs, the remaining content tokens may padded with PAD tokens. These padding tokens are ignored in the transforming process within the context transformer 302.

As described above, within the context transformer 301 are self-attention layers (e.g., first self attention layer 301*a*). At each step (and each layer), the self-attention layers compute an attention score between each of the pairs of token embeddings. These attention scores are numbers between 0 and 1 for each pair, and can be used for post-hoc analysis of the model. Also at each step (and each layer), the self-attention layers transform the input token embedding into a transformed embedding of the input content. See, e.g., VASWANI et al., "Attention is All You Need," December 2016, arxiv.org/abs/1706.03762 (discussing a "Transformer Model" and transformed embeddings); and ALAMMAR, "The Illustrated Transformer," June 2018, jalammar.githu-b.io/illustrated-transformer/(the entire contents of each of which are hereby incorporated by reference herein). The output of the context transformer 301 therefore provides at the outputs 301-Out a final transformed embedding for each of the input tokens (including the context tokens 305).

Embodiments of the present invention, use the attention scores of the first attention layer 301*a* to compute the importance of each input token for the model decision. Therefore, the outputs 301*a*-Out from the first attention layer 301*a* are connected to the decision head 302 to provide an importance of each input token to the decision head 302. The final transformed representation of the query object token (CLS) 303*a* is compared the embeddings of all possible entities (from an predefined data set) to get a score for each possible entity. The highest scored entity is selected as the predicted object 310. Its score is then saved.

Furthermore, the outputs corresponding to each of the input context information tokens are combined with the attention score outputs of the first attention layer 301*a* inside the model with the help of a decision head 302. The decision head 302 scores each context information, respectively, according to the significance of the model's decision-making. This can be done with supervision or even in a semi-supervised manner. In a preferred embodiment, the decision head 302 comprises a multilayer perceptron with a sigmoid activation function. The decision head generates a significance score 309 for each of the relevant embeddings used in making the link prediction 310. The significance score is a number between 0 and 1. This output may be converted to a probability.

A multilayer perceptron is a class of feedforward artificial neural network. Except for the input nodes, the each node uses a nonlinear activation function. In a preferred embodiment, the nonlinear activation function is a sigmoid activation function. A sigmoid function is a bounded, differentiable, real function that is defined for all real input values and has a non-negative derivative at each point and exactly one inflection point. The sigmoid function has an s-shaped curve that is bound between 0 and 1. The multilayer perceptron is trained using backpropagation.

As an illustrative example, consider a context transformer has 50 inputs, 6 self-attention layers, a feedforward dimension of 1280, a dropout rate of 0.1 and ReLU activation functions. For each context token 305, 50 attention scores (numbers from 0 to 1) are determined, as well as a transformed representation of the associated context embedding (e.g., with a dimension of 256). The attention scores can be sorted from left-to-right regarding the input tokens (e.g., the first the attention scores belong to the attention with the query triple). Afterwards, the 50 attention scores are concatenated to a transformed representation to obtain a new representation (e.g., of dimension 306 for an input dimension of 256).

The multilayer perceptron (e.g., with 3 layers, a dropout rate of 0.1 and ReLU=max(0, x) activation functions) to reduce this dimension to 1. The final representation is fed into a sigmoid activation function to obtain a final score between 0 and 1, which represents the importance of the specific input token during the model's decision making for the link prediction.

According to an embodiment of the present invention, a method is provided that (1) uses a non-monotonous, double positional embedding schema to make self-attention based models aware of different types of context and their inter-connections; and (2) adding a decision head on top of the self-attention model that enables the computation of the significance of different input context tokens for the deci-sion-making in a supervised or semi-supervised way. A type-embedding layer is combined with a coherence-embed-ding layer (see FIG. 3 bottom) to make the model agnostic about different kind of context information and their inter-connections. A decision head is built that combines the output of the last layer with the output of the first self-attention layer of each context token, respectively (see FIG. 3 top), to score its significance in the final decision-making of the link prediction model.

The second use case of the model according to embodi-ments of the present invention is a special case of the link prediction problem. In particular, the goal is to align equiva-lent entities between two different KGs. This task is referred to as entity alignment. Embodiments translate the task of EA into a link prediction problem by merging the two KGs into a single one and adding 'sameAs' triples of the form $(e_1,$ SameAs, $e_2)$ such that $e_1 \in KG_1$ and $e_2 \in KG_2$.

Figure 4:
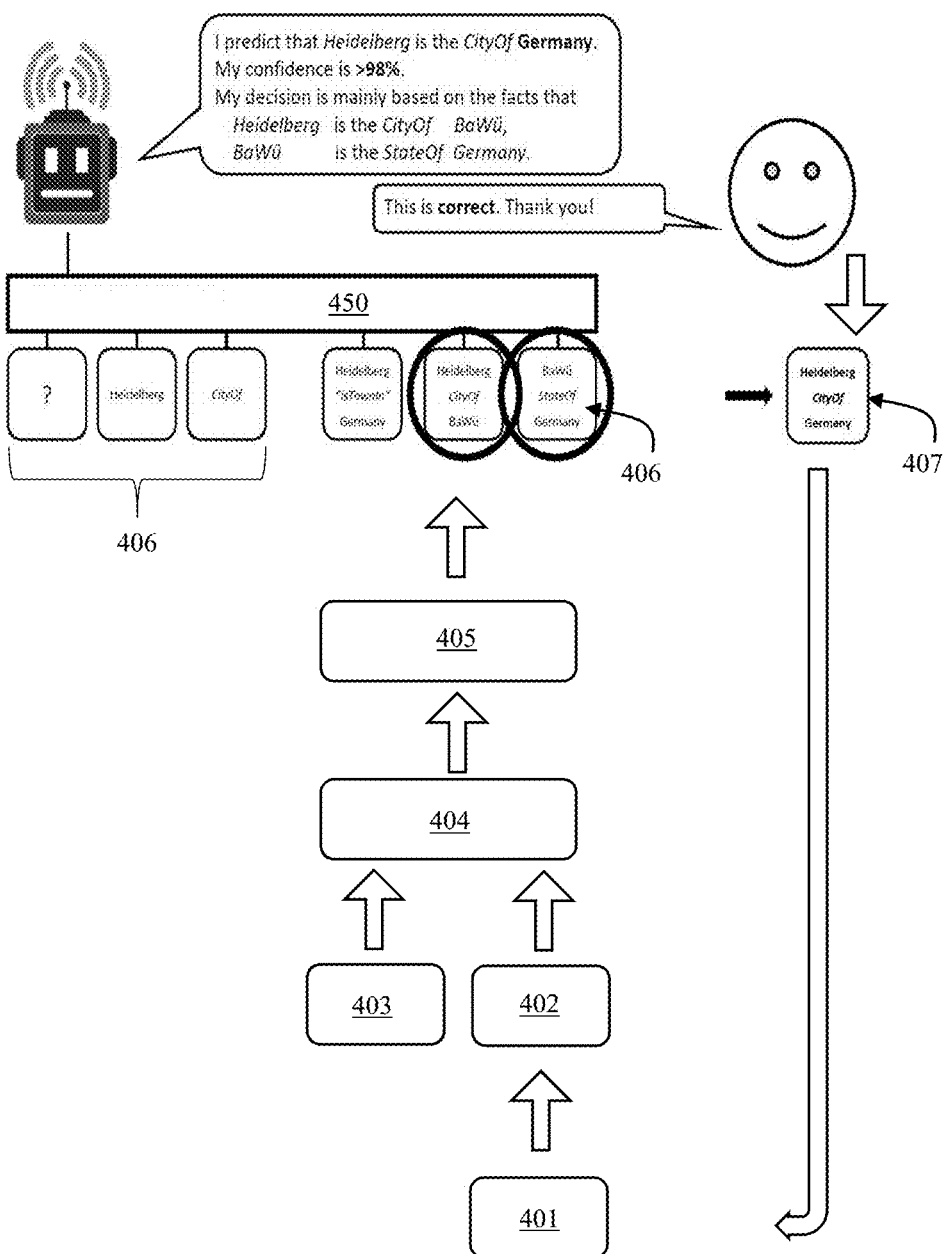
FIG. 4 illustrates an embodiment of a decision explanation and human interaction operations according to the present invention.

FIG. 4 illustrates an example method of updating a knowledge graph that includes a decision explanation and human interaction. The method's output is optimized for human interaction. Due to its internal structure, the method can explain the predictions. These explanations combined with a confidence score support human annotators analyzing the recommended links. Accepted links are highly accurate, thus can be reused as novel knowledge.

The method operates on date of interest in the form of a knowledge graph 401. The knowledge graph is comprised of triples (e.g., Heidelberg, CityOf, Germany). The knowledge graph 401 is, at the outset, incomplete. That is, there are missing links. The method of FIG. 4 is configured to predict these missing links using a self-attention based model 450, and to update the knowledge graph 401 accordingly.

Prior to predicting the links, the model 450 is trained. This can be considered an "offline" or "training" phase of the method. In the training phase, the method processes the knowledge graph 401 to provide a self-supervised training set 402. The processing may include making an object for each of a number of complete triples (i.e., ones with a known link between two objects) such that triple is now incomplete. For example, the "country" object may be masked out of the triple (Heidelberg, CityOf, Germany) to create the training example: (Heidelberg, CityOf, ?)→Germany. The training set 402 may be split into a test set and validation set (e.g., divided 50%/50% at random).

The method also acquires relevant context 403. The acquiring of context may be done by any means known in the art, and is adaptable according to the task and data. Context may be OpenIE links, images, rules, etc.

For each object and each context, the method determines a type, such as knowledge_graph_item, oie_triple, image, unknown, etc. For each object and each context, the method adds knowledge about cohesion by grouping the objects and contexts together. For example, Heidelberg, OIE triples about Heidelberg, and an image of Heidelberg may all be placed in the same group. This creates a processed data set 404 of categorized and grouped objects and context.

The processed data set 404 is then converted into vector data 405 for sending to the model 450. These vectors are also called embeddings. Specifically, the method creates content embeddings, type embeddings, and group embeddings. The content embeddings are derived from the knowledge graph and context information (e.g., are an embedding for a complete triple). The type embeddings are derived using the determined type of the objects and contexts (discussed above). The group embeddings are derived using the determined groups of objects and contexts (discussed above). As an example, look up tables may be used for specific there are specific embeddings for content (e.g., Berlin, Heidelberg, etc.), for types (e.g., oie_triple, image, etc.) or for groups (e.g., group2, group5, etc.).

For each item sent to the model 450, the method adds the relevant content embedding with the relevant type embedding and the relevant group embedding. In other words, each input embedding 406 to the model 450 includes its associated content embedding, type embedding, and group embedding. This provides the non-monotonous, double positional embedding schema.

The model 450 is also fed with a self-supervised training example 406 (discussed above). Here, the model 450 is tasked with finding the missing link (or query) for the training example 406 (e.g., the query is for the "country" object for (Heidelberg, CityOf, ?).

In a preferred embodiment, the model 450 includes a neural network with multiple layers of self-attention and a decision head. Initial values of the hyperparameters of the neural network may be set prior to training. Additionally, or alternatively, a hyperparamter space may be set for a search to optimize the hyperparameters. For each self-supervised training example 406, the model makes a prediction for the missing link. In a preferred embodiment, the prediction is a final output vector for the query "?" generated by running the input through the neural network, including its multiple layers of self-attention.

The output vector is compared with the embeddings of the knowledge graph objects. The model is "trained" by modifying parameters of its neural network layers (e.g., weights and other hyperparameter) until the output vector is closer to the ground truth answer (i.e., what was masked out to create the training example). The training of the model 450 by be done through backpropagation.

Through the mechanism of self-attention, the model 450 generates an attention score between each two inputs. This attention score, especially in the first self-attention layer, gives insights on how much attention the model puts on a specific input to answer the query. After the final attention layer, besides the query output, the model 450 provides an output for each single input. The model 450 combines these outputs with the attention scores of the first self-attention layer.

In a preferred embodiment, the combination is done by the decision head of the model. Accordingly, the decision head receive the outputs of the final layer of the neural network and the output of the first self-attention layer. In a preferred embodiment, the decisions head using a multilayer perceptron with a sigmoid activation function to generate a significance score between 0 and 1.

If data or presuppositions on which context can be important for some queries are available, the model can learn through backpropagation that this context will be mapped to 1 after the decision head.

Once the model 450 is trained with the training set. The model 450 may be operated in a validation mode. The validation mode is similar to what is described above, except that the model 450 is not modified (e.g., not modified through backpropagation). Instead, the validation data set is used to grade how well the model 450 has been trained. That is, to determine the accuracy of the model 450.

Once the model 450 has been adequately trained, and its accuracy verified, the model 450 may be operated in an online mode. In the online mode, the model 450 is operated to actually learn missing links. In the online mode, instead of using a training example 406 as the input, an actual query can be presented, but in the same form of the training example 406 (e.g., as embeddings with a query for the missing semantics, context, object, etc.).

In the online mode, the output of the decision head of the model 450 includes a prediction of the query, and may further include a confidence score for that prediction. This output may also include a subset of the most relevant facts used to make that prediction. In a preferred embodiment, the most relevant facts are determined as a predetermined number of facts associated with input embeddings having the highest significance score.

In a preferred embodiment, a human operator is in the loop. The human operator may be presented with the prediction, confidence score, and decision basis. With this information, the human operator may make a determination that the finding is correct, and approve a new triple 407 with the missing link to be added to the knowledge graph.

What follows are several exemplary use cases illustrating the advantages of embodiments of the present invention. These use cases include drug discovery, the financial domain, and human resources. Embodiments of the present invention are not restricted to these use cases.

Embodiments of the present invention may be adapted for drug discovery via biomedical knowledge graphs. As a structured representation of information, knowledge graphs play an import role in the biomedical domain. One such knowledge graph may represent drugs and proteins, as well as their interactions. Links in this knowledge graph consist of facts such as (Drug X; upregulates; Protein A), (Protein A; interacts with; Protein B) or (Drug X; causes headache when taken with; Drug Y).

When a new drug is developed, it is not sufficient to analyze its effects and by-effects in isolation. For example, polypharmacy prediction and drug repurposing are two import problems in drug development that concentrate on the interaction between two or more drugs, proteins, and diseases. The polypharmacy prediction determines, for any pair of drugs, what side-effects they might cause in patients that one would not encounter if the drugs were taken individually. The second problem predicts whether some already approved drugs (e.g., from the FDA) could be useful for treating other diseases. In the language of knowledge graphs, these problems translate into finding new links in the knowledge graph. Thus, an embodiment of the present invention may be applied for such use cases.

With the exponential growth of the number of articles in the biomedical area, the amount of names of drugs, proteins, and diseases grew dramatically as well. Another difficulty is that most of this information is encoded in form of unstructured text. Embodiments use data crawling to extract structured OpenIE triples from such unstructured texts. These OpenIE triples can provide new information like: ("Protein B"; "has a negative effect on"; "Drug X."), which embodiments can use to enhance the Biomedical knowledge graph.

Often, there is large amount of metadata integrated in a knowledge graph that further describes the origin of the drugs, proteins or even their interactions. For example, the metadata could include articles about Protein B explaining its connections to Drug Y. Embodiments of the present invention can encode the knowledge graph as well as all possible context like OpenIE triples and the metadata to do the link prediction task in a more precise manner.

The novel links recommended by the link prediction models according to embodiments of the present invention come with a confidence score as well as an explanation of the decision process. For example, instead of the sole output: ("Drug X"; "negatively interacts with"; "Drug Y"), embodiments of the present invention give a confidence score, e.g., 85%, and an explanation. The explanation, for example, may point on the article that connects Protein B with Drug Y as well as the OpenIE triple that represents the negative effect of Protein B on Drug X.

The link recommendation is given to a human annotator together with the confidence and the explanation of the decision. After evaluating the models output with help of the explanation, the human decides whether to accept or reject the new link. This step ensures the quality of the new link, which comes with at least two advantages: 1) there is a high confidence in the decision that is needed in critical domains like biomedicine; 2) adds new knowledge to the knowledge graph, in a manner that strengthens the data allows for iteratively retraining the model with a reduced risk of compounding errors.

An embodiment of the present invention may also be provided for entity alignment for the biomedical domain. Suppose there are two knowledge graphs from the biomedical domain. In addition, there are natural language text documents (e.g., research papers). An embodiment of the present invention could be used to align entities across the knowledge graphs in order to integrate the knowledge graphs into one. In addition, the embodiment could be used for applying alignments between relational data bases. As a preprocessing step, a relational database could be translated into a knowledge graph, which in turn can be aligned with another knowledge graph.

The present invention also has advantages in the financial domain. Suppose a company has its own knowledge graph of the financial domain. A common scenario is that such companies also possess many financial reports that are written in natural language text. An embodiment of the present invention can be used for leveraging the contextual information from the financial reports into the knowledge graph for knowledge graph completion (KGC), i.e., via link prediction.

For example, the present invention may be used for entity alignment for populating the financial domain. Suppose a company has two different knowledge graphs of the financial domain. Such knowledge graphs usually share a set of entities and relations that are specific for the domain. The knowledge graphs, however, may contain information about how certain entities are related, which are present in the one knowledge graph, but missing in the other. For this reason, it is important that there exists a system that can align equivalent entities across the knowledge graphs. Such entity alignment methods makes the knowledge graph integration automatic and cheap (e.g., it would be much more expensive if such labor is done by humans). Moreover, an embodiment of the present invention can leverage information from financial reports, which is frequently written in natural language text.

Embodiments of the present invention may also be useful for entity alignment for human resources. Suppose there are two knowledge graphs constructed from two professional social networks. In many cases, the profiles in the two knowledge graphs will match (e.g., companies have profiles on different social networks to increase visibility and people often have several profiles on different professional social networks to improve their chance of employment). Different professional social networks, however, may contain different information about the same entity types (e.g., one knowledge graph may contain information about one person's particular skills, while other may contain information about the person's endorsements and recommendations by other people). An embodiment of the present invention can be used for integrating such knowledge graphs by matching the equivalent entities. An effective alignment of these entities will result in a new knowledge graph that complements the information about the entities across different dimensions. Such newly created knowledge graph will help human resource professionals to find the most relevant matches for a given job position.

Embodiments of the present invention include a method for link prediction. The method for link prediction may include one or more of the following operations:

1. receiving a data set comprised of entities, relations, and triples;

2. adding—respectively for each entity, relation, and triple—context information;

3. splitting the data set into a training subset and a validation subset;

4. choosing fitting hyperparameters and/or setting up a hyperparameter space for a search;

5. running a link prediction model, which is configured according to an embodiment of the present invention, on the training data; and/or 6. testing the link prediction model on the validation data.

Embodiments of the present invention include a method for entity alignment. The method for entity alignment may include may include one or more of the following operations:

1. Receiving a data set;

2. Inputting training data (i.e., seeding) by providing KG1, KG2, seed alignments as triples of the form (e1, SameAs, e2);

3. Splitting the training data set into a validation set and a test data set, which each provide unseen entity alignment triples of the form (e1, SameAs, e2);

4. Optionally performing canonicalization of the open relations;

5. Injecting, in the training set, OpenIE triples with disambiguated arguments. The disambiguation may be with respect to each individual KG. As for the relations, instead of the standard open relations, cluster IDs to which the open relation belongs to may be used;

6. Optionally filtering out, in the training set OpenIE triples with SameAs entities in development and test data set. To illustrate, consider a set S as the set of all entities that appear in both the development and the test data. If an OpenIE triple from the training set contains at least one entity that is also found in the set S, then this OpenIE triple is filtered out;

7. Operating the link prediction model to perform the knowledge graph completion (i.e., link prediction) task;

8. Applying (e.g., during training) a unit-norm constraint on the entity embeddings such that the entity embeddings are all of a length 1;

9. Forcing (e.g., during training) the SameAs relations to have embeddings of ones. For example, in an embodiment of the training algorithm, when a triple of the form (e1, SameAs, e2) is encountered, the embeddings of the SameAs relations are forced to be of the form [1, 1, . . . 1] (i.e. embeddings of ones);

10. Training the entity alignment model (e.g. in an offline mode);

11. Operating the trained entity alignment model to produce results (e.g., in an online mode). For example, after training the entity alignment model, a query in the form of (e1, SameAs, ?) or (?, SameAs, e2) may be provided to the input of the model, which produces the result for the queried entity. The outputs determined from a set of such queries constitute the "results";

12. Offering the results to a human labeler for evaluation;

13. Updating the KG based on the (evaluated or non-evaluated) results; and/or

14. Iterating the operations 2-13.

As used above, the term "disambiguated arguments" means that the arguments of the triple (i.e., the subject and the object) have unambiguous identifiers beside their surface form. For example, the arguments "Joe Biden" and "Joseph Biden Jr." have the same meaning, though on string level they are different. With "disambiguated" arguments, these strings would be replaced with an unambiguous ID (e.g., the URL of the Wikipedia page about Joe Biden).

Embodiments of the present invention offer advantages over the current state of the art.

For example, for link prediction, specialized state of the art models do not and cannot take in account multiple different kinds of data. However, embodiments of the present invention make use of several information sources to do link prediction. For example, embodiments can combine an embedding based approach with logic based rule-mining methods. While current state of the art models mostly act as black-box machines that rarely explain their decisions at all, embodiments of the present invention give a confidence score, an attention-based explanation, and depending on the context, even a reasoning-based explanation. Such rich output enables embodiments of the present invention to introduce a human in the loop to enhance its decisions even more.

The resulting newly acquired knowledge is of such high accuracy that it can re-enter the workflow to further improve the data as well as the model in a recurrent manner.

Also, embodiments of the present invention are flexible regarding the use of different types of context information, including additional data beyond intrinsic triples (e.g., external context). This is in contrast to what is achievable by the state of the art. For example, OntoEmma needs a fixed input of context and can only be used for the task of Ontology Alignment instead of general link prediction. See, Lucy Lu Wang et al.: Ontology Alignment in the Biomedical Domain Using Entity Definitions and Context. BioNLP (2018) (the entire content of which is hereby incorporated by reference herein). Also, HittER only utilizes context in form of other intrinsic triples. See, Sanxing Chen et al.: HittER: Hierarchical Transformers for Knowledge Graph Embeddings, arXiv 2008.12813v1 (August 2020) (the entire contents of which are hereby incorporated by reference herein).

For entity alignment, due to the incompleteness problem of the knowledge graphs (i.e., the lack of context for the entities), the performance of state of the art methods suffers compared to embodiments of the present invention. One line of work focuses on capturing the already existing neighboring information within the knowledge graphs. For example, RDGCN uses graph neural networks to capture triangular neighboring information of the entities, which leads to improved representation of the KG information and improved performance for the EA task. See Yuting Wu, et al., "Relation-Aware Entity Alignment for Heterogeneous Knowledge Graphs," IJCAI (2019) (the entire contents of which are hereby incorporated by reference herein. Other lines of work focuses on providing additional contextual information to the KGs. For example, BootEA addresses such problem by bootstrapping a seed training data for triples of the form (e1, SameAs, e2). See Zequn Sun et al., "Bootstrapping Entity Alignment with Knowledge Graph Embedding," IJCAI (2018) (the entire contents of which is hereby incorporated by reference herein. AttrE provides further context by adding and modeling attribute KG triples (e.g., (dbo:Heidelberg, geo:lat, 49.416668)). See Bayu Distiawan et al., "Entity Alignment between Knowledge Graphs Using Attribute Embeddings," AAAI (2019) (the entire contents of which is hereby incorporated by reference herein).

In contrast, embodiments of the present invention provide a method that: 1) exploits large amounts of textual information in order to provide more relevant neighboring information of the entities; and 2) uses human in the loop to update the model.

While prior methods work on either single triples, only reasoning or individual context, models according the present invention are able to combine these inputs as well as to include any other possible context. Also, unlike the state of the art, embodiments provide an embedding based model that uses reasoning-based explanations and gives highly precise confidence scores for its decision making.

In contrast to embodiments of the present invention, alternative models could encode each input individually and combine with latent representation, however such alternative models have a lower performance than the embodiments of the present invention. Also, in contrast to embodiments of the present invention, alternative models could use attention scores exclusively to explain the model's decision-making; however, this would lead to imprecise confidence scores as well as frequent incomprehensible explanations.

Figure 5:
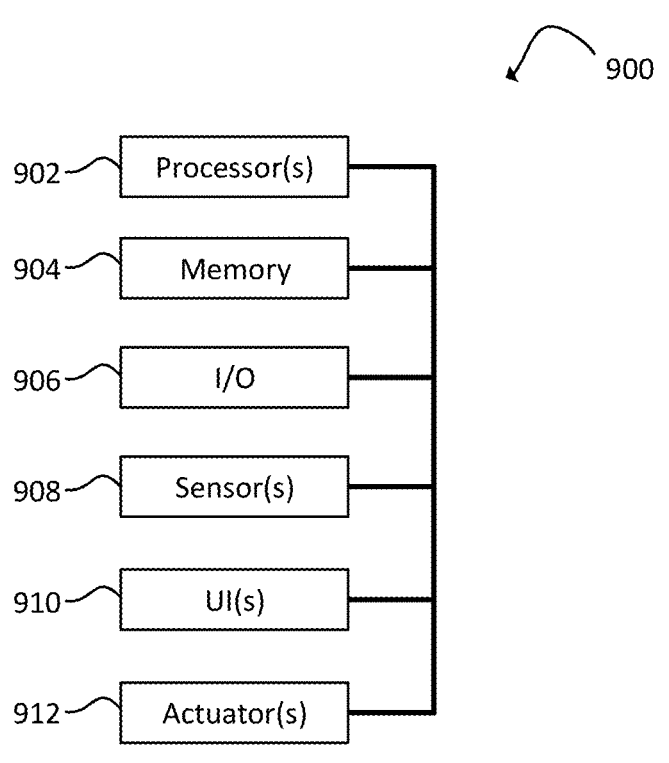
FIG. 5 illustrates a processing system according to an embodiment of the present invention.

Referring to FIG. 5, a processing system 900 can include one or more processors 902, memory 904, one or more input/output devices 906, one or more sensors 908, one or more user interfaces 910, and one or more actuators 912. Processing system 900 can be representative of each computing system disclosed herein.

Processors 902 can include one or more distinct processors, each having one or more cores. Each of the distinct processors can have the same or different structure. Processors 902 can include one or more central processing units (CPUs), one or more graphics processing units (GPUs), circuitry (e.g., application specific integrated circuits (ASICs)), digital signal processors (DSPs), and the like. Processors 902 can be mounted to a common substrate or to multiple different substrates.

Processors 902 are configured to perform a certain function, method, or operation (e.g., are configured to provide for performance of a function, method, or operation) at least when one of the one or more of the distinct processors is capable of performing operations embodying the function, method, or operation. Processors 902 can perform operations embodying the function, method, or operation by, for example, executing code (e.g., interpreting scripts) stored on memory 904 and/or trafficking data through one or more ASICs. Processors 902, and thus processing system 900, can be configured to perform, automatically, any and all functions, methods, and operations disclosed herein. Therefore, processing system 900 can be configured to implement any of (e.g., all of) the protocols, devices, mechanisms, systems, and methods described herein.

For example, when the present disclosure states that a method or device performs task "X" (or that task "X" is performed), such a statement should be understood to disclose that processing system 900 can be configured to perform task "X". Processing system 900 is configured to perform a function, method, or operation at least when processors 902 are configured to do the same.

Memory 904 can include volatile memory, non-volatile memory, and any other medium capable of storing data. Each of the volatile memory, non-volatile memory, and any other type of memory can include multiple different memory devices, located at multiple distinct locations and each having a different structure. Memory 904 can include remotely hosted (e.g., cloud) storage.

Examples of memory 904 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 904.

Input-output devices 906 can include any component for trafficking data such as ports, antennas (i.e., transceivers), printed conductive paths, and the like. Input-output devices 906 can enable wired communication via USB®, Display-Port®, HDMI®, Ethernet, and the like. Input-output devices 906 can enable electronic, optical, magnetic, and holographic, communication with suitable memory 906. Input-output devices 906 can enable wireless communication via WiFi®, Bluetooth®, cellular (e.g., LTE®, CDMA®, GSM®, WiMax®, NFC®), GPS, and the like. Input-output devices 906 can include wired and/or wireless communication pathways.

Sensors 908 can capture physical measurements of environment and report the same to processors 902. User interface 910 can include displays, physical buttons, speakers, microphones, keyboards, and the like. Actuators 912 can enable processors 902 to control mechanical forces.

Processing system 900 can be distributed. For example, some components of processing system 900 can reside in a remote hosted network service (e.g., a cloud computing environment) while other components of processing system 900 can reside in a local computing system. Processing system 900 can have a modular design where certain modules include a plurality of the features/functions shown in FIG. 9. For example, I/O modules can include volatile memory and one or more processors. As another example, individual processor modules can include read-only-memory and/or local caches.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the present invention. In particular, the present invention covers further embodiments with any combination of features from different embodiments. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for operating a machine learning model comprising a context transformer and a decision head, the context transformer comprising a neural network having a plurality of self-attention layers, the machine learning model configured to make a link prediction for a query embedding, the method comprising:

obtaining from a first data source of the one or more external data sources, one or more first knowledge graphs and first context data associated with the one or more first knowledge graphs;

obtaining, from a second data source of the one or more external data sources, one or more second knowledge graphs and second context data associated with the one or more second knowledge graphs;

canonicalizing the one or more first knowledge graphs, the first context data, the one or more second knowledge graphs, and the second context data to obtain canonicalized knowledge graphs and canonicalized context data;

generating knowledge graph embeddings based on the canonicalized knowledge graphs and the canonicalized context data, receiving, input embeddings at inputs of the context transformer, the input embeddings comprising:

a query embedding set, the query embedding set comprising a subject embedding, object embedding, and relation embedding, wherein one of the subject embedding, the object embedding, and the relation embedding is the query embedding; and the knowledge graph embeddings comprising first embeddings of triples associated with the respective knowledge graphs and second embeddings of the respective context data;

generating, by a first self-attention layer of the self-attention layers, an attention score for each of the input embeddings;

generating, by a final layer of the neural network of the context transformer, the link prediction for the query embedding and an output associated with each of the input embeddings;

combining, by the decision head, the attention score and the output for each of the input embeddings to determine a significance score for each of the input embeddings; and outputting the link prediction and the significance score for a subset of the input embeddings.

2. The method of claim 1, wherein the machine learning model is operating in a training phase, wherein, during the training phase, the query embedding set is a training embedding set having an associated ground truth vector for the query embedding, and wherein, during the training phase, the method further comprises:

outputting the link prediction as a link prediction vector;

comparing the link prediction vector with vectors of the knowledge graph embeddings; and iteratively training the content transformer, using back-propagation, to change the link prediction vector until it is within a predetermined distance to the ground truth vector.

3. The method of claim 2, wherein the decision head comprises a multilayer percep-tron with sigmoid activation functions, and wherein, during the training phase, the method further comprises:

receiving a predetermined significance score associated with at least one of the knowledge graph embed-dings;

iteratively training the decision head, using backpropa-gation, to change the significance score generated for the at least one of the knowledge graph embeddings until it is within a second predetermined distance to the predetermined significance score.

4. The method of claim 3, wherein the predetermined significance score is provided by a human operator.

5. The method of claim 2, the method further comprising, prior to a training phase:

transforming the triples of the respective knowledge graphs into self-supervised training examples by mask-ing an object, relation, or subject of each of the triples, each of the self-supervised training examples compris-ing an incomplete triple and associated ground truth data indicated the masked one of the object, relation or subject;

receiving, from the one or more external data sources, the respective context data comprising a plurality of con-text relevant to the respective knowledge graphs;

respectively associate individual context of the plurality of context with relevant ones of entities, relations, and the triples of the respective knowledge graph;

determine for each of the entities, the relations, the triples, and the plurality of context a type and a group;

generate the query embedding from a selected one of the self-supervised training examples and the determined type and group of the selected one of the self-super-vised training examples; and generate the knowledge graph embeddings from the triples of the respective knowledge graphs and the type and the group for the entities, the relations, the triples, and the plurality of context.

6. The method of claim 5, wherein the method comprises splitting the self-supervised training examples into a training set and a validation set at random.

7. The method of claim 6, the method further comprising, after a training phase, a test phase comprising:

for a plurality of the self-supervised training examples in the validation set:

receiving, at query inputs of the inputs of the context transformer, a current validation embedding set, the current validation embedding set comprising a respective one of the plurality of the self-supervised training examples from the validation set;

generating, by the first self-attention layer of the self-attention layers, the attention score for each of the knowledge graph embeddings and the current vali-dation embedding set, generating, by the final layer of the neural network of the context transformer, the link prediction for the current validation embedding set and the output associated with each of the input embeddings, combining, by the decision head, the attention score and the output for each of the input embeddings to determine the significance score for each of the input embeddings; and outputting the link prediction and the significance score for the subset of the input embeddings; and determining an accuracy of model based on comparing the link prediction and the associated ground truth data associated with each of the plurality the plurality of the self-supervised training examples from the validation set.

8. The method of claim 1, wherein the knowledge graph embeddings are non-monotonous, double positional embed-dings.

9. The method of claim 1, wherein the knowledge graph embeddings further comprise a related type-embedding and a related coherence-embedding.

10. The method according to claim 1, wherein in an entity alignment mode, the method comprises providing the query embedding set with the relation embedding being a SameAs embedding and one of the subject embedding and the object embedding being the query embedding.

11. The method according to claim 1, the method com-prising:

outputting the link prediction and the significance score via a human-machine interface;

receiving feedback input from the human-machine inter-face; and and updating the at least one of the knowledge graphs according to a link prediction based on the feedback indicating an accepted link prediction.

12. The method of claim 1, wherein generating the knowledge graph embeddings comprises:

merging the canonicalized knowledge graphs and the canonicalized context data into a joint knowledge graph;

seeding the joint knowledge graph with equivalent enti-ties, wherein the equivalent entities are triples com-prising a first, second, and third component, wherein the first and the third component are SameAs facts; and generating the knowledge graph embeddings based on the joint knowledge graph comprising the seeded equiva-lent entities.

13. The method of claim 12, further comprising:

receiving user input comprising the equivalent entities.

14. The method of claim 12, wherein the link prediction is a plurality of links between equivalent entity triples, and wherein the method further comprises:

providing information indicating the plurality of links between the equivalent entity triples to an operator;

receiving user input indicating to update the joint knowl-edge graph based on a subset of the plurality of links; and updating the joint knowledge graph based on the subset of the plurality of links.

15. The method of claim 1, wherein the knowledge graphs comprise a plurality of facts associated with proteins, drugs, and interactions between the proteins and the drugs, and wherein the link prediction indicates a new link in a joint knowledge graph, which was generated by merging the canonicalized knowledge graphs and the canonicalized context data, between one of the proteins and one of the drugs.

16. A system comprising one or more processors which alone or in combination, are configured to provide for execution of a method for operating a machine learning model comprising a context transformer and a decision head, the context transformer comprising a neural network having a plurality of self-attention layers, the machine learning model configured to make a link prediction for a query embedding, the method comprising:

obtaining, from a first data source of the one or more external data sources, one or more first knowledge graphs and first context data associated with the one or more first knowledge graphs;

obtaining from a second data source of the one or more external data sources, one or more second knowledge graphs and second context data associated with the one or more second knowledge graphs;

canonicalizing the one or more first knowledge graphs, the first context data, the one or more second knowledge graphs, and the second context data to obtain canonicalized knowledge graphs and canonicalized context data;

generating knowledge graph embeddings based on the canonicalized knowledge graphs and the canonicalized context data;

receiving, input embeddings at inputs of the context transformer, the input embeddings comprising:

a query embedding set, the query embedding set comprising a subject embedding, object embedding, and relation embedding, wherein one of the subject embedding, the object embedding, and the relation embedding is the query embedding; and the knowledge graph embeddings comprising first embeddings of triples associated with the respective knowledge graphs and second embeddings of the respective context data;

generating, by a first self-attention layer of the self-attention layers, an attention score for each of the input embeddings;

generating, by a final layer of the neural network of the context transformer, the link prediction for the query embedding and an output associated with each of the input embeddings;

combining, by the decision head, the attention score and the output for each of the input embeddings to determine a significance score for each of the input embeddings; and outputting the link prediction and the significance score for a subset of the input embeddings.

17. A tangible, non-transitory computer-readable medium having instructions thereon which, upon being executed by one or more processors, alone or in combination, provide for execution of a method for operating a machine learning model comprising a context transformer and a decision head, the context transformer comprising a neural network having a plurality of self-attention layers, the machine learning model configured to make a link prediction for a query embedding, the method comprising:

obtaining from a first data source of the one or more external data sources, one or more first knowledge graphs and first context data associated with the one or more first knowledge graphs;

obtaining, from a second ta source of the one or more external data sources, one or more second knowledge graphs and second context data associated with the one or more second knowledge graphs;

canonicalizing the one or more first knowledge graphs, the first context data, the one or more second knowledge graphs, and the second context data to obtain canonicalized knowledge graphs and canonicalized context data;

generating knowledge graph embeddings based on the canonicalized knowledge graphs and the canonicalized context data;

receiving, input embeddings at inputs of the context transformer, the input embeddings comprising:

a query embedding set, the query embedding set comprising a subject embedding, object embedding, and relation embedding, wherein one of the subject embedding, the object embedding, and the relation embedding is the query embedding; and the knowledge graph embeddings comprising first embeddings of triples associated with the respective knowledge graphs and second embeddings of the respective context data;

generating, by a first self-attention layer of the self-attention layers, an attention score for each of the input embeddings;

generating, by a final layer of the neural network of the context transformer, the link prediction for the query embedding and an output associated with each of the input embeddings;

combining, by the decision head, the attention score and the output for each of the input embeddings to determine a significance score for each of the input embeddings; and outputting the link prediction and the significance score for a subset of the input embeddings.

* * * * *